(12) United States Patent
Hayashi et al.

(10) Patent No.: US 7,983,980 B2
(45) Date of Patent: Jul. 19, 2011

(54) AUTOMATIC BIDDING AGENTS FOR AUCTION SYSTEM

(75) Inventors: Tomoaki Hayashi, Kanagawa-ken (JP);
Yoshinobu Honda, Kanagawa-ken (JP);
Yoshiaki Sawano, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 458 days.

(21) Appl. No.: 11/938,652

(22) Filed: Nov. 12, 2007

(65) Prior Publication Data
US 2008/0249888 A1    Oct. 9, 2008

(30) Foreign Application Priority Data

Nov. 30, 2006 (JP) .................................. 2006-322904

(51) Int. Cl.
*G06Q 40/00* (2006.01)
(52) U.S. Cl. .......................................... 705/37; 705/26.1
(58) Field of Classification Search .................... None
See application file for complete search history.

(56) References Cited

U.S. PATENT DOCUMENTS

| 7,346,571 | B1 * | 3/2008 | Fujita ............................... | 705/37 |
| 2002/0143687 | A1 * | 10/2002 | Bahar ............................... | 705/37 |

FOREIGN PATENT DOCUMENTS

| JP | 2001-216460 | 8/2001 | |
| JP | 2001-357252 | 12/2001 | |
| JP | 2002-041857 | 2/2002 | |
| JP | 2003-183278 | 1/2005 | |
| WO | WO2007075020 | * | 7/2007 |

OTHER PUBLICATIONS

Du et al., Analysis of Bidding Behavior on eBay Auctions, Oct. 2006, E-Business Engineering, IEEE International Conference on e-Business Engineering (ICEBE'06), Abstract. http://doi.ieeecomputersociety.org/10.1109/ICEBE.2006.26.*
"Is Cooperation Possible Even with a Cold Heart?: Cooperation Theory for Autonomous Agents," bit (Japan), Sep. 1995, vol. 27, No. 9, pp. 54-62.

* cited by examiner

*Primary Examiner* — Hani Kazimi
*Assistant Examiner* — Muriel Tinkler
(74) *Attorney, Agent, or Firm* — Novak Druce + Quigg

(57) ABSTRACT

There is provided a system which enables human-like automatic bidding by combining a plurality of processing functions with a bidding logic of absentee agents for absent participants of an auction system. Absentee agents, present in an auction server, receive price distribution and perform bidding similarly to on-site human participants. Absentee information is given to the absentee agent at the start of an auction, and absentee agents make bids autonomously and in cooperation with one another. In order to perform the human-like bidding, each agent makes a bid by combining (1) bidding possibility determination processing, (2) final bidding determination processing, (3) repeat bidding determination processing, (4) repeat bidding prohibition determination processing, (5) right acquisition bidding determination processing, and (6) character bidding determination processing. Here, the character bidding determination processing determines a bidding atmosphere from the rate of bidding and the number of bidders, and dynamically assigns a character to each absentee agent.

20 Claims, 12 Drawing Sheets

| PARAMETER (ParentServer.properties) | FUNCTION | DEFAULT |
|---|---|---|
| WAIT_WEIGHT_VARIABLE | BASE WEIGHT FACTOR OF Wait INTERVAL USED IN CONSECTIVE BIDDING PROHIBITION DETERMINATION PROCESSING (THE LARGER IT IS, THE SHORTER BIDDING INTERVAL IS) | 10 |
| WAIT_RANDOM_VARIABLE | WEIGHT FACTOR OF VARIATION OF Wait INTERVAL USED IN CONSECTIVE BIDDING PROHIBITION DETERMINATION PROCESSING (THE LARGER IT IS, THE SHORTER BIDDING INTERVAL IS) | 5 |
| REPEAT_POSIBILITY_VARIABLE | BASE VALUE OF RANDOM NUMBER WHICH DETERMINES WHETHER OR NOT TO MAKE BID REPEATEDLY (THE SMALLER IT IS, THE HIGHER CONSECTIVE BIDDING PROBABILITY IS) | 2 |
| REPEAT_COUNT_VARIABLE | COEFFICIENT OF RANDOM NUMBER WHICH DETERMINES count OF CONSECTIVE BIDDING (THE LARGER IT IS, THE LARGER COUNT OF CONSECTIVE BIDDING IS) | 5 |
| CHARACTER_COUNT_WEIGHT | DISTRIBUTION INTERVAL AT WHICH CountBidder MAKES BID (THE SMALLER IT IS, THE LARGER COUNT OF CONSECTIVE BIDDING IS) | 30 |
| CHARACTER_ANY_BIDDER_WEIGHT | BASE VALUE OF RANDOM NUMBER FOR DETERMINING PROBABILITY THAT AnyBidder MAKES BID (THE SMALLER IT IS, THE HIGHER BIDDING PROBABILITY IS) | 7 |
| CHARACTER_RANGE_BIDDER_WEIGHT | BASE VALUE OF RANDOM NUMBER WHICH DETERMINES PRICE WHICH RangeBidder BIDS (THE SMALLER IT IS, THE LARGER COUNT OF CONSECTIVE BIDDING IS) | 30 |
| CHARACTER_FAST_BIDDER_WEIGHT | BASE VALUE OF RANDOM NUMBER FOR DETERMINING PROBABILITY WITH WHICH FastPushBidder MAKES BID (THE SMALLER IT IS, THE HIGHER BIDDING PROBABILITY IS) | 7 |

AUTOMATIC BIDDING AGENTS FOR AUCTION SYSTEM

CROSS-REFERENCE TO RELATED APPLICATION

This application claims the benefit of Japanese Patent Application No. 2006-322904, filed on Nov. 30, 2006, which is incorporated herein by reference in its entirety.

FIELD OF THE INVENTION

The present invention is related the field of auction systems, and more particularly to providing automatic bidding agents for an auction system.

BACKGROUND OF THE INVENTION

Operations for performing auctions of various articles, including used cars, art objects, racehorses, flowers, seafood, and livestock have been systematized to varying degrees. For example, in the auction of used cars, an auction system can be configured with multiple terminals and a server for managing the terminals so as to facilitate the auctioning of cars collected at an auction site. Auction participants can make bids not only through the terminals disposed at the site, but also through remote terminals connected via a communications network. However, there are instances in which auction participants may not be able to monitor, continuously or nearly continuously, the auction owing to constraints of location, time, or the like. Even in such instances, though, participants often wish to participate in the bidding process through some mechanism.

Accordingly, there is a need for a system which appropriately enables the automatic bidding on behalf of absent participants that cannot directly attend the auction during the entire time that it is on-going. For example. Japanese Unexamined Patent Publication (Kokai) No. 2005-18476 discloses an absentee bidding host or the like, in which two prices (a reference price and a ranking price), as references for bidding, are preliminarily set, and which executes bidding patterns according to which: (1) the host unconditionally makes a bid if the bidding price is below the reference price; (2) the host makes a bid if the bidding price is above the reference price and below the ranking price as long as it is under a slow-down control (a state where the progress speed of the auction is intentionally slowed down) and another bidder is present; and (3) the host unconditionally makes a bid even when the bidding price exceeds the reference price until it comes under a slow-down control regardless of the presence or absence of another bidder.

However, since many conventional absentee bidding systems simply use random numbers for determining bids to make, bidding patterns become monotonous, so that the existence of absentee participants can be distinguished only by on-site participants. In addition, even in the method of Japanese Unexamined Patent Publication (Kokai) No. 2005-18476, since the bidding is performed in accordance with a predetermined rule, the bidding can be easily discerned to be automatic bidding once the rule is understood. Namely, the absent participants who participate in an auction system are easily recognized to be absent participants due to the monotony of the bidding pattern, and they may be disadvantaged in attempting to issue winning bids. When recognized as the absent participants, the bidding price may be intentionally raised by on-site bidders or sellers, and they may be forced to win a higher bid. Accordingly, there is no efficient or effective method of increasing a conclusion rate of the auction other than the skill of an auction provider.

SUMMARY OF THE INVENTION

In view of the problems described above, an object of the present invention is to provide an auction system, an auction server serving as a core thereof, and a controller that enables automatic bidding on behalf of an absent participant. Another object is to provide automatic bidding in such a manner that that the automatic bidding is not readily distinguishable from human bidding behavior.

In a first aspect of the present invention, there is provided an auction system. The system can include: a plurality of terminals and an auction server, connected to the terminals via a network and having a plurality of modules, each defining an absentee agent for making bids at an auction in response to requests, received via the terminals, from absent participants that cannot attend the auction. An absentee agent can include: means for determining a bidding atmosphere of the auction based on an accelerating rate of bid prices (e.g., less time between successive bids and/or accelerating increases in offered price of successive bids) at the auction and the number of bidders that make bids at the auction; means for determining a character pattern for assigning a character to each of the absentee agents in accordance with the bidding atmosphere and the number of the absentee agents that can make bids in the auction system; and means for changing the character of the absentee agent based on the character pattern and an ID of the absentee agent on the basis of a predetermined probability.

According to one configuration, the auction system of the present invention provides absentee agents, automated entities resident at the auction server (a server for controlling the progress of the auction), which submit bids on behalf of participants who are absent from the auction. The bidding is performed in a variety of ways, especially by assigning characters to absentee agents. An absentee agent can determine the bidding atmosphere from the bidding prices (distributed prices) and the number of bidders, calculate the character pattern for assigning the character to each of the absentee agents based on the bidding atmosphere and the number of the absentee agents that can make bids, and stochastically change the character of the absentee agent. A terminal of the system is not limited to the terminal disposed at the auction site, but can include a remote PC (Personal Computer), a mobile terminal, or other communication/computing device connected via the network.

The character of the absentee agent can include a first character (active group) by which the absentee agent makes a bid based on a probability rather than a bidding price, a second character (fast push group) by which the absentee agent makes a bid based on the probability rather than a bidding price, but at a bidding interval that is shorter than a bidding interval for an absentee agent with the other character, a third character (passive group), by which the absentee agent makes a bid at a certain distribution interval, and a fourth character (prudent group) by which the absentee agent makes a bid when the difference between a current price and a price at a previous bidding is within a predetermined range. In addition, the absentee agent may include means for assigning the character pattern by exchanging messages with and/or cooperating with other absentee agents. The absentee agent may include means for transmitting a message to another absentee agent having an absentee price in first place when the former agent's absentee price is not in first place, the absentee price being a preset by an upper limit of the bidding price, as well as means for determining whether or not to make a bid in response to an answer to the message.

Additionally, the auction server can have a first timer defining a maximum time period from a time when a highest price is bid in the event that the auction is in a "sell out state" to a time when a bidder having the highest price is determined to be a successful bidder if there is no next bidder. The absentee agent can further include means for making a bid within the time period given by the first timer and after a time period defined by a second timer held by the absentee agent elapses. The "sell out state," as used herein, refers to a state where an auction price does not increase unless a bidder makes a new bid. However, in order not to accidentally overlook a bidding opportunity due to different timers being used, bidding may be performed once when the state is turned to the "sell out state" for the first time.

It is also possible to intentionally change the bidding atmosphere itself by the absentee agents having the characters thus assigned.

In this manner, it is possible to eliminate a disadvantage of the absent participants and to provide them with bidding opportunities, which may be equal to or greater than those given to on-site bidders. In fact, it becomes possible to provide advantages for three distinct parties—namely, an auction organizer, sellers, and buyers—by changing the bidding atmosphere and increasing a conclusion rate.

According to the present invention, since the absent participants can make bids that more closely resemble human bidders present at the auction, the automatic bidding is not readily discernable. Accordingly, absent participants need not be disadvantaged relative to on-site participants, and bidding opportunities may be provided equally to on-site participants.

In another aspect of the present invention, there is provided an auction server for realizing the functions of the auction system described above. In yet another aspect of the present invention, there is provided a method for causing the auction server to perform the functions described above. In still another aspect of the present invention, there is provided a computer-readable medium comprising a computer program for causing the auction server to perform the functions described above

BRIEF DESCRIPTION OF THE DRAWINGS

There are shown in the drawings, embodiments which are presently preferred. It is expressly noted, however, that the invention is not limited to the precise arrangements and instrumentalities shown.

FIG. 7 is a table of parameters used for absentee agent processing, according to an embodiment of the invention;

DETAILED DESCRIPTION

Figure 1:
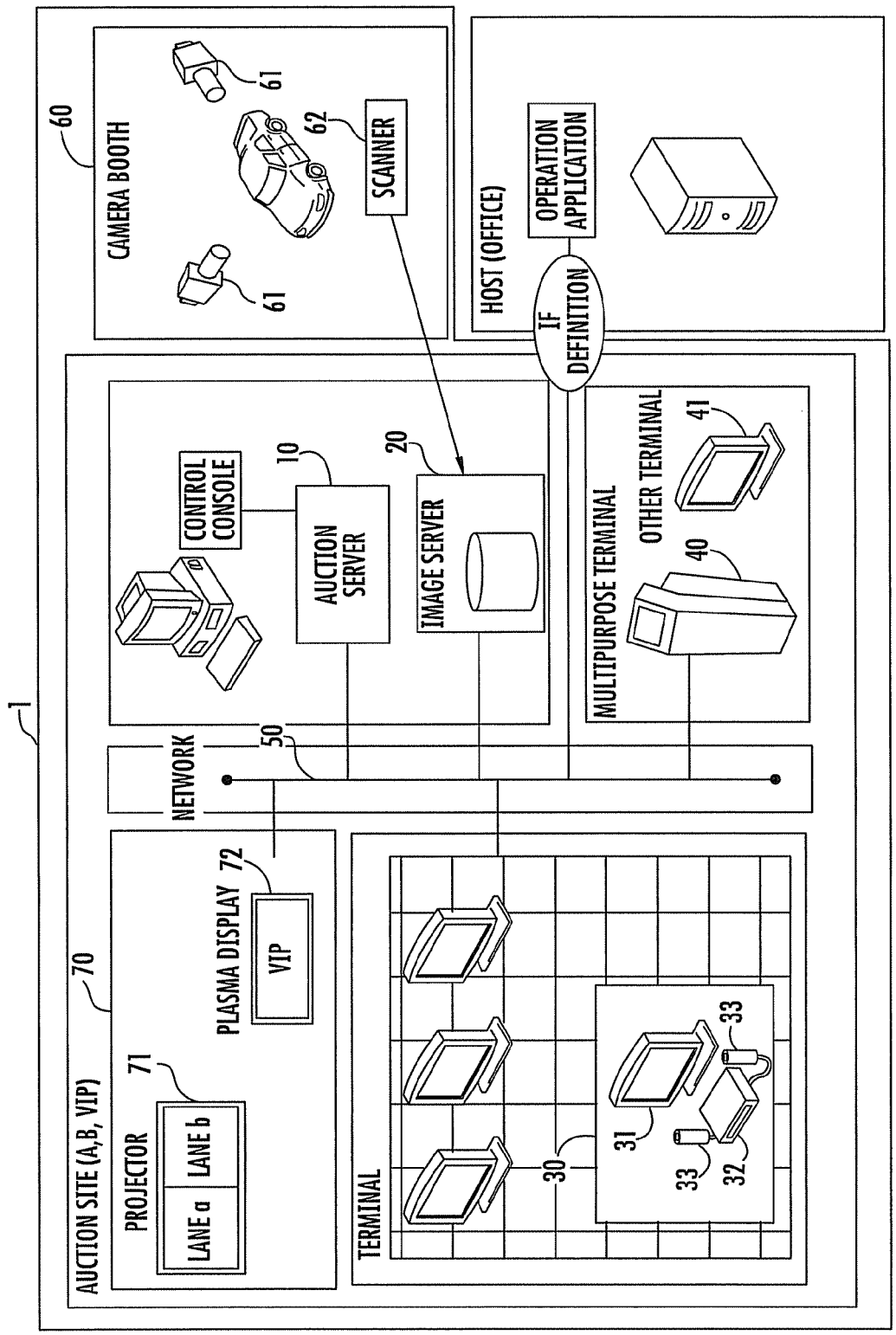
FIG. 1 is a schematic overview of an exemplary auction system in which absentee agents, according to an embodiment of the invention, can be utilized.

FIG. 1 is a schematic overview of an exemplary auction system, which strictly for purpose of clear exposition, is a used car auction system 1; it is expressly noted that the invention pertains to other auction systems as well and that the underlying features are readily adaptable to other types of auctions. The auction system 1 illustratively includes an auction server 10 for controlling the progress of the auction, an image server 20 for accumulating moving images of used cars and other image data, a plurality of terminals 30 for auction participants to perform bidding, a large-size display unit, such as a projector 71 and a plasma display 72, for displaying the progress of the auction in the auction site, a multipurpose terminal 40, and other terminal 41, each connected to a network 50. While the auction server 10 can be a special-purpose device, it can alternatively be a general-purpose server or other network-connected device. (A hardware configuration of the auction server 10, according to one embodiment, is described more particularly below in connection with FIG. 12.)

Illustratively, each terminal 30 includes a display unit 31, an authentication device 32, and a bidding button 33. It can also include a control unit, a keyboard, or the like. Although two bidding buttons 33 are shown in the drawing, they are for enabling the terminal to simultaneously make bids at the auction which usually proceeds on two lanes. The authentication device 32 is for an auction participant to authenticate himself using an IC card or the like, and is also used for identification of the participant. While the terminal 30 may be such a special-purpose device, it may be also be a general-purpose device, such as a PC or other communication/computing device. In addition, the network 50 may be a LAN (Local Area Network), WAN (Wide Area Network), the Internet, or the remote network using a dedicated line.

An auction site 70 can be divided into a site A, a site B, and a site for VIPs, for example, wherein each site is provided with the large-size display unit, such as the projector 71 and the plasma display 72, on which the currently progressing auction is displayed. There is shown here a state where progress of two auctions with respect to lanes a and b are simultaneously displayed on the projector 71.

Meanwhile, in a camera booth 60, image data of a used car on exhibition taken by a plurality of cameras 61 or of an assessment table of the used car scanned in a scanner 62 is preliminarily distributed to the image server 20. Distribution of the image data can be performed using a publicly known distribution technique, such as the Peer-To-Group (P2G). The image data recorded on the image server 20 is sequentially displayed on the large-size display unit or the terminal 30, and the auction proceeds.

It is explicitly noted that although the multipurpose terminal 40 and the other terminal 41 are disposed in the auction system 1, these terminals are mainly used for the participants to acquire information of the whole site or various information of the auction held on that day.

In one embodiment of the present invention, an absent participant requests formation of an absentee agent using the terminal 30 or the multipurpose terminal 40, as well as other terminals. The absentee agent is described herein as being implemented in computer-readable code (software), configured so as to reduce the need for user-directed operations. It will be readily understood by one of ordinary skill, however, that the absentee agent alternatively can be implemented in hardwired circuitry or a combination of circuitry and computer-readable code. Implemented in software, means for forming the absentee agent can use an existing technique, such as the Agent Framework. Although the absentee agent may be started up each time by the absent participant from the terminal 30 or the multipurpose terminal 40, the absent participant may also assign one of a plurality of the absentee agents which are preliminarily registered in the system for exclusive use. The absentee agent automatically makes a bid in place of the absent participant. Although the absentee agent typically operates in the auction server, it may also be formed in a server other than the auction server or in a different terminal so as to communicate with the auction server. A feature of the system of the present invention is to enable human-like automatic bidding by combining a plurality of processing techniques with a bidder logic of the absentee agent of the auction system, as described more particularly below.

Figure 2:
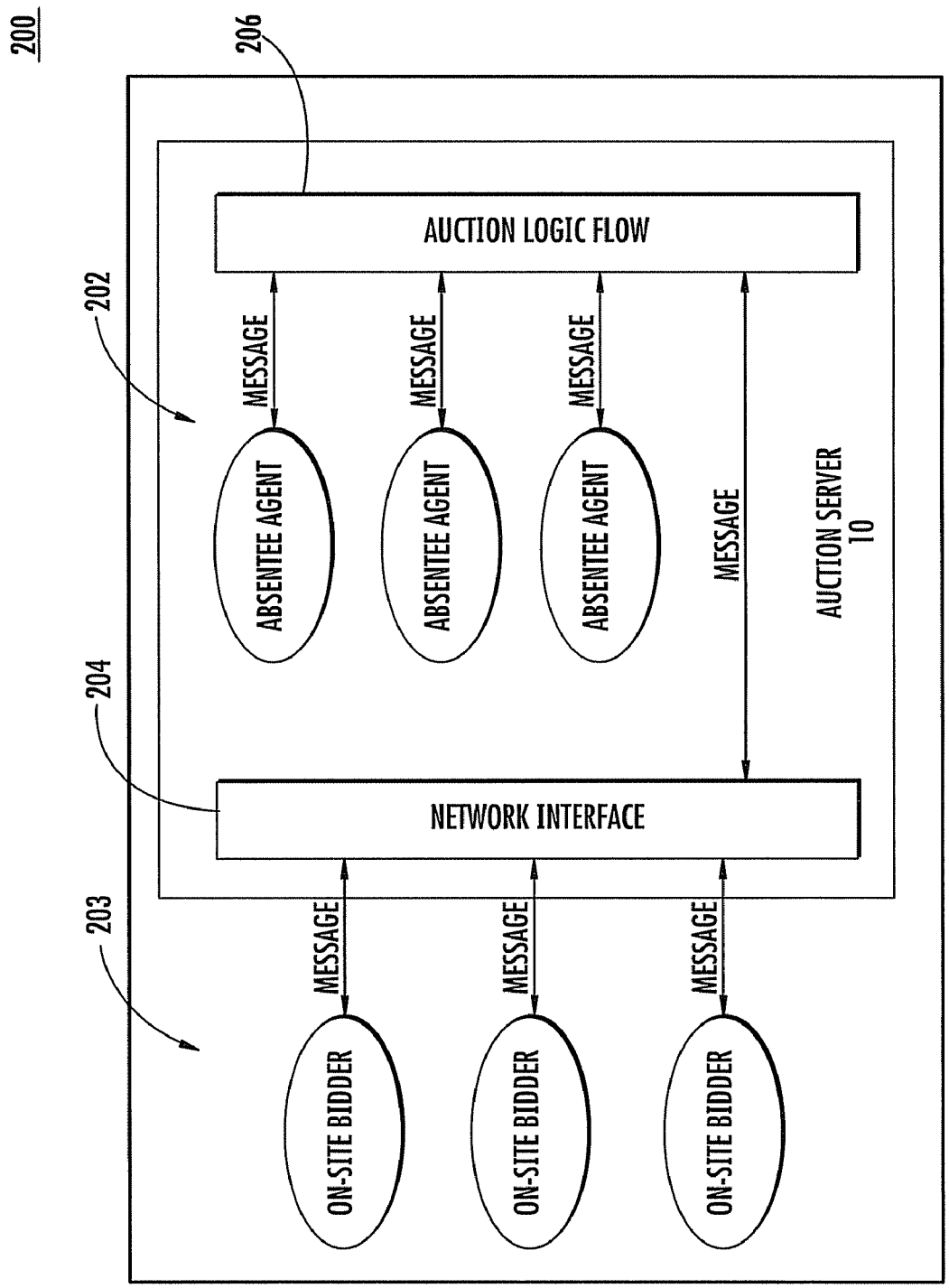
FIG. 2 is a schematic diagram illustrating absentee agents in the auction system, according to an embodiment of the invention.

Referring additionally to FIG. 2, a schematic diagram illustrates the absentee agents 202 in the auction system 1. Specifically, absentee agents 202, residing at the auction server 10, receive the price distribution and make bids, similarly to on-site participants (human beings) 203, via the network interface 204. The absentee agents communicate with an auction logic flow 206 in the auction server 10 by exchanging messages therewith. The absentee agents are given absentee information set by the absent participants at the start of the auction, and make bids autonomously and in cooperation with each other. In order to perform the human-like bidding, each absentee agent can perform the bidding process by combining the processes as described more particularly below.

Figure 3:
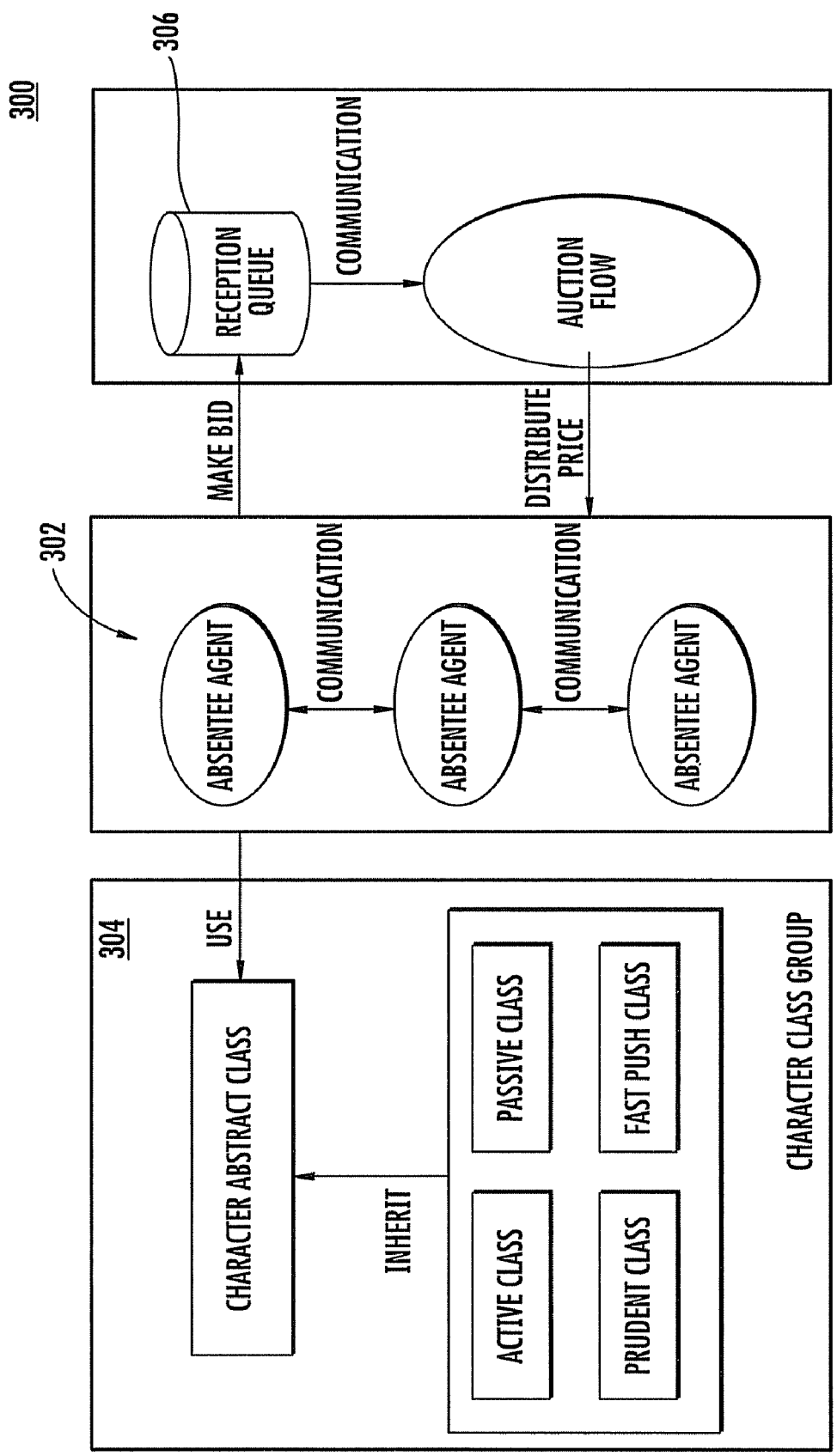
FIG. 3 is a schematic diagram illustrating a relation between the absentee agents and character classes, according to an embodiment of the invention.

FIG. 3 is a schematic diagram illustrating a relation between absentee agents 302 and character classes 304. As shown in the drawing the absentee agent exhibits the characteristics of an object-oriented class, and a character abstract class inherited from character class groups representing characteristics of bidding patterns is provided thereto. The character class comprises, for example, an "active class" which makes a bid actively, a "passive class" which makes a bid only at a constant interval, a "prudent class" which analyzes the auction state and makes a bid cautiously, and a "fast push class" which repeats the bidding at fast speed. The absentee agent uses the character abstract class in accordance with a pattern predetermined by the inter-agent communication or the like. By this mechanism, the absentee agent "to which a character is given" sends a bidding message thereafter to the auction flow with a characteristic pattern based on, or corresponding to, the character. At this time, a reception queue 306 is used for managing the order of the bidding. The auction flow distributes bids made to respective absentee agents.

Figure 4:
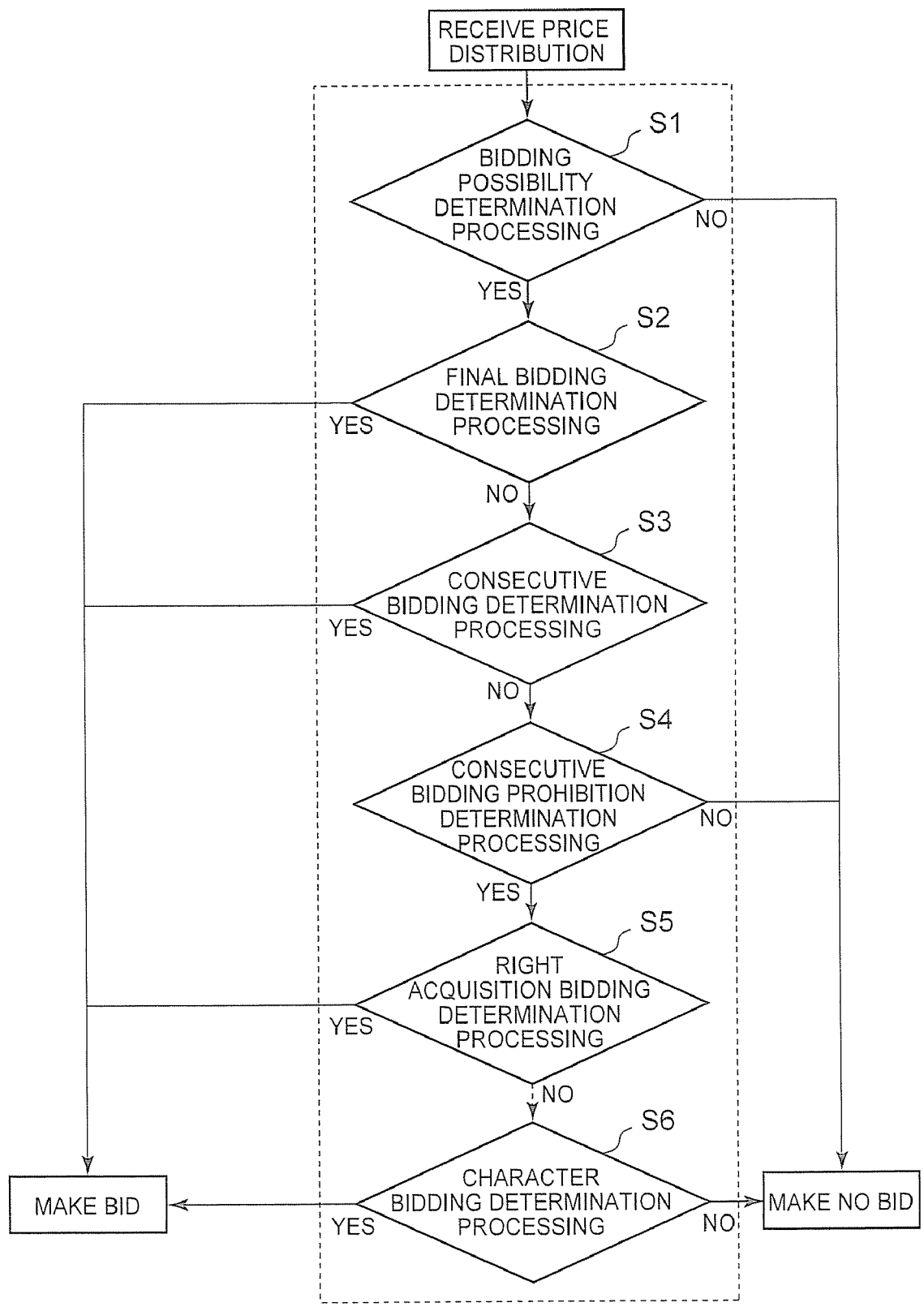
FIG. 4 is a flow chart of exemplary steps performed in processing by the absentee agent, according to an embodiment of the invention.

FIG. 4 illustrates a flow chart of the processing performed by the absentee agent. A portion surrounded by the dotted line represents the processing by the absentee agent. Each processing is configured by the following steps (S1-S6).

Step S1: Bidding Possibility Determination Processing.

Here, it is determined whether or not the absentee agent can make a bid. If the bidding is possible, the processing proceeds to Step S2.

Step S2: Final Bidding Determination Processing.

Here, the bidding is performed when the bidding price at the next price distribution exceeds a preliminarily set absentee price, and the absentee agent performs the inter-agent communication with the agent in the absentee first place for processing so that a final successful bidding price would not be disadvantageous to the absentee first place. The absentee first place refers to that absentee agent having the highest bidding price among the absentee agents.

Step S3: Repeat Bidding Determination Processing.

Here, the processing is performed to make a bid repeatedly for several times after the bidding is performed once. It is the processing effected for performing natural-type bidding.

Step S4: Repeat Bidding Prohibition Determination Processing.

Here, a prohibition range is set where the bidding cannot performed for a certain time period after it is performed once. It is the processing for performing the natural-type bidding.

Step S5: Right Acquisition Bidding Determination Processing.

Here, the processing is performed to acquire a right for winning a bid.

Step S6: Character Bidder Determination Processing.

This processing is a core feature of this particular aspect of the invention. Here, the character is assigned to the absentee agent, and a variation is given by making a bid in accordance with the character.

Figure 5:
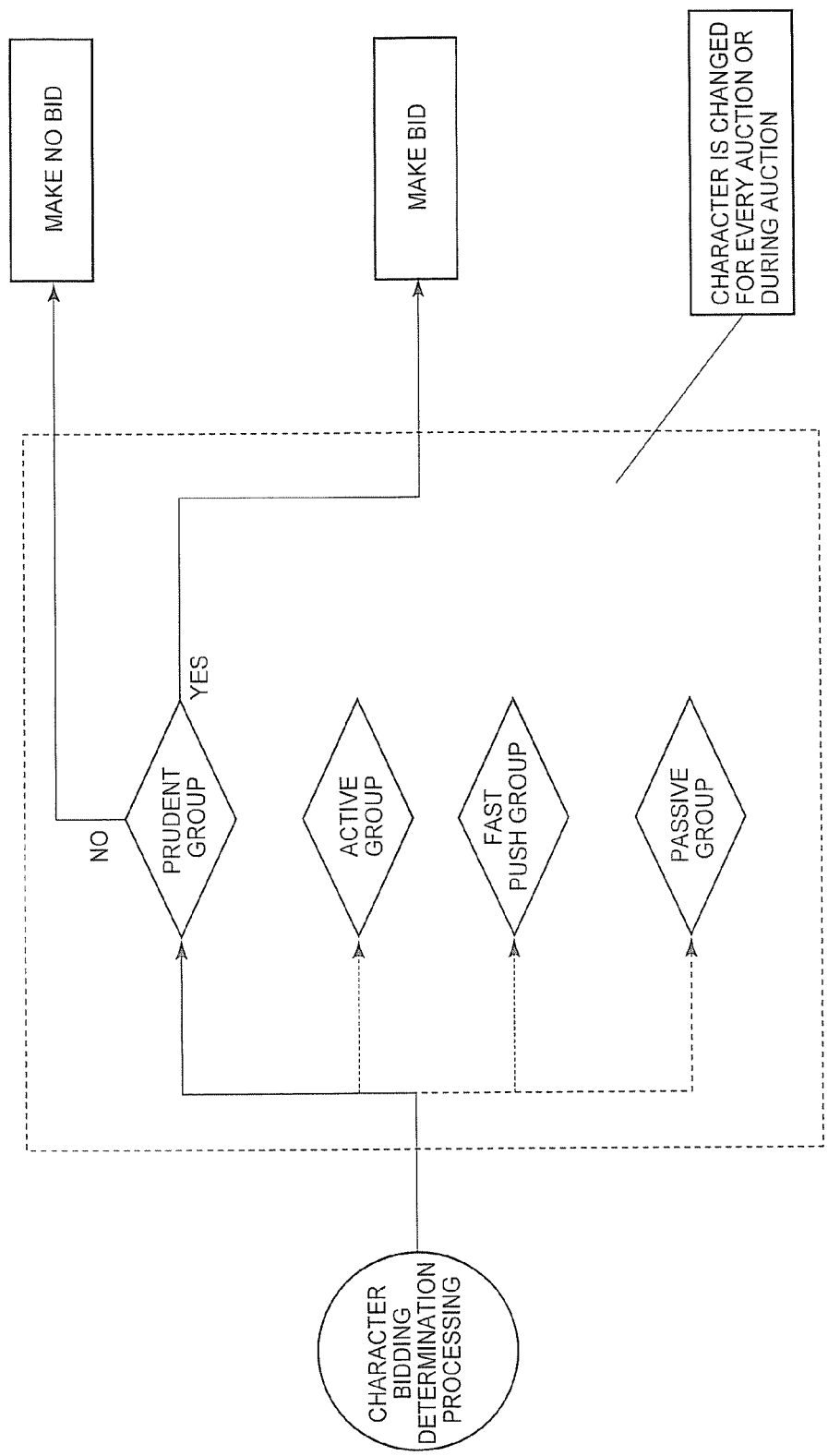
FIG. 5 is a flowchart illustrating an example of the bidding determination processing based on characters, according to an embodiment of the invention.

FIG. 5 is a flowchart illustrating an example of the bidding determination processing based on the character (Step S6, above). Here, the determination processing as to whether or not to make a bid varies depending on the character, namely, the active group, the passive group, the fast push group, or the prudent group. It is shown that the characters are changed for every auction and/or during the auction.

Figure 6:
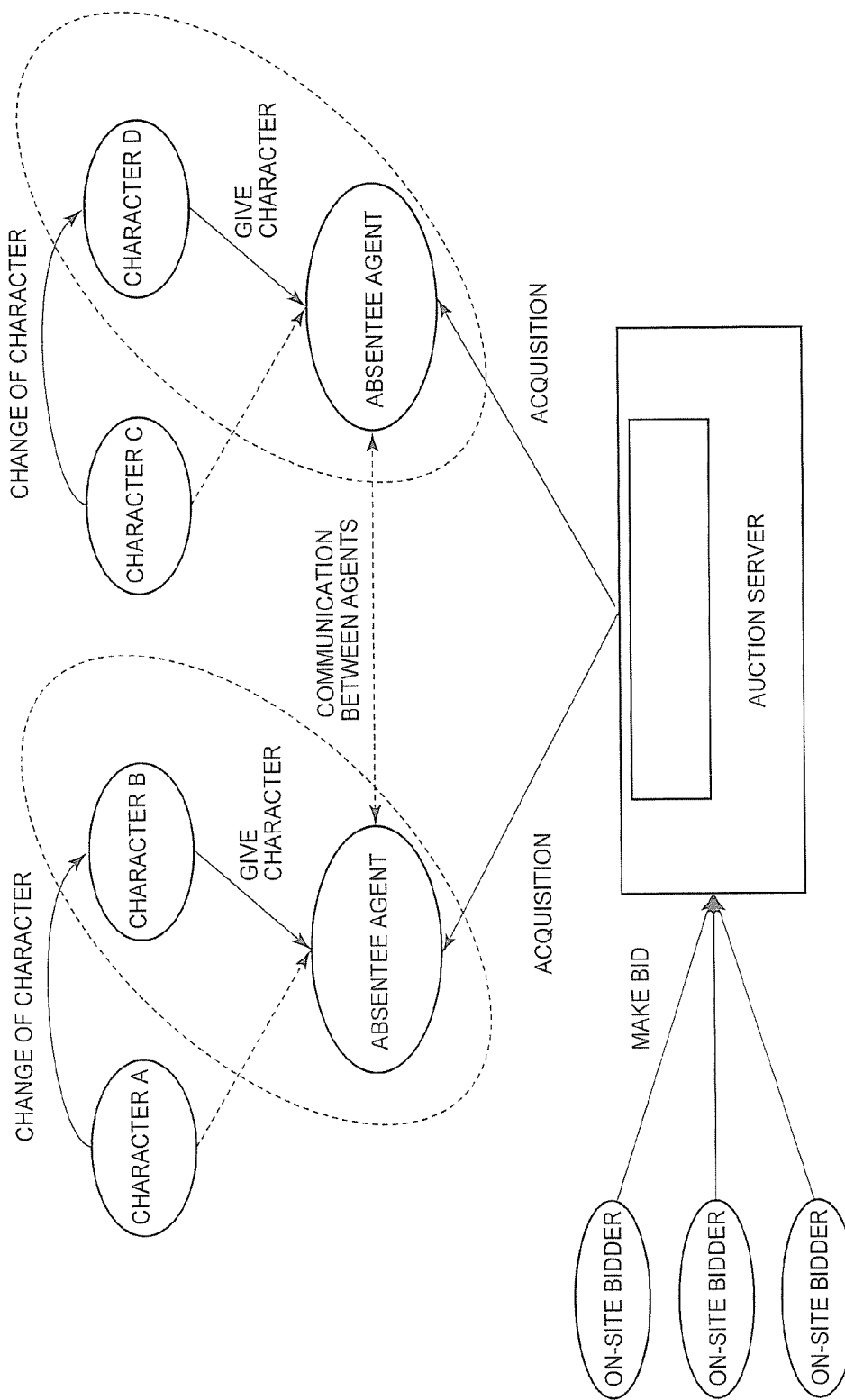
FIG. 6 is a schematic diagram illustrating an overview of the dynamic character change, according to an embodiment of the invention.

FIG. 6 is a schematic diagram illustrating a simple overview of the dynamic character change. The distribution price or the number of bidders are accumulated as the information in the auction server by the bidding by on-site bidders, and the information changes every moment. It is shown that the information is acquired by the absentee agent and that giving a character to each absentee agent is changed using the inter-agent communication.

A variation occurs in the biddings by combining these processes, and the automatic bidding is not distinguishable. Hereinafter, each processing technique is described in more detail.

1. Bidding Possibility Determination Processing: #canBid( ) Method.

This processing is called when the absentee price is below a present price, and determines whether or not the bidding is possible (if the bidding is not possible, subsequent processing is not performed). When there is no slow right holder or no final bidder in a state other than the slow right holder, it determines that the bidding is possible if the following condition applies. Here, the slow right holder is a person who makes a the highest price in a slow state (usually, the state where an auction price increases at a slower rate than every 50 s, for example). In the bidding possibility determination processing, determinations (1) and (2) are performed, as follows:

(1) If the absentee agent is not in the absentee first place, the bidding price is below the absentee price of the absentee first place even when the bidding is performed.

(2) If the absentee agent is in the absentee first place, the right holder is not itself in a sell out state.

2. Final Bidding Determination Processing: #checkFinalBid( ) Method.

In this processing, the bidding is performed if the bidding price at the next price distribution exceeds the absentee price. The absentee agent performs the inter-agent communication with the agent in the absentee first place for processing so that a final successful bidding price would not be disadvantageous to the absentee first place. The bidding is performed when the bidding price at the next price distribution exceeds the absentee price. However, since the final successful bidding price may change due to a timing of the bidding if the bidding is performed at the price same as that of the absentee first place, processing (1) and (2) are performed before the bidding, as follows:

(1) If not at the absentee first place, transmit a message to the absentee first place before the bidding. When the absentee first place receives the message, it bids and returns CallBack. The bidding is performed after receiving CallBack from the absentee first place.

(2) If at the absentee first place, perform the bidding.

FIG. 7 is a table of parameters used for absentee agent processing. This is the table showing a list of the parameters (referred to as ParentServer.Properties) used in the following description. WAIT_WEIGHT_VARIABLE is used in the repeat bidding prohibition determination processing, and is a base weight factor of a Wait interval, wherein the larger the value thereof is, the shorter the bidding interval is. WAIT_RANDOM_VARIABLE is used in the repeat bidding prohibition determination processing, and is a weight factor of the variation of the Wait interval. REPEAT_POSIBILITY_VARIABLE is a base value of the random number which determines whether or not to make a bid repeatedly, wherein the smaller the value thereof is, the higher a repeat bidding probability is. REPEAT_COUNT_VARIABLE is a coefficient of the random number which determines the number of repeat bidding, wherein the larger the value thereof is, the larger the number of repeat bidding is. CHARACTER_COUNT_WEIGHT is the distribution interval at which <CountBidder>, one of the characters as described later, makes a bid, wherein the smaller the value thereof is, the larger the number of biddings is. CHARACTER_ANY_BIDDER_WEIGHT is the base value of the random number which determines a probability that <AnyBidder>, one of the characters as described later, makes a bid, wherein the smaller the value thereof is, the higher the bidding probability is. CHARACTER_RANGE_BIDDER_WEIGHT is the base value of the random number which determines the price for which <RangeBidder>, one of the characters as described later, makes a bid, wherein the smaller the value thereof is, the larger the number of biddings is. CHARACTER_FAST_BIDDER is the base value of the random number for determining the probability that <FastPushBidder>, one of the characters as described later, makes a bid, wherein the smaller the value thereof is, the higher the bidding probability is. In the actual system, by adjusting these parameters, the system can be constituted in which the automatic bidding is less likely to be distinguished.

3. Repeat Bidding Determination Processing: checkRepeatBid( ) Method.

In this processing, the bidding is repeatedly performed for several times after having been performed once. It is determined to repeatedly make a bid after the bidding is performed once. The following processing steps (1) to (5) are performed in the processing for the natural bidding.

(1) Random number is run at the previous bidding to determine how many times the biddings are consecutively performed thereafter.

(2) Bidding is performed if the repeat bidding is possible, and the number of times of the repeat bidding is decremented.

(3) The determination as to whether or not to perform the repeat bidding is performed using the parameter "REPEAT_POSIBILITY_VARIABLE."

(4) The determination of the number of times of the repeat bidding when the bidding is repeated is performed by the random number using the parameter "REPEAT_COUNT_VARIABLE."

(5) Priority is given over the repeat bidding prohibition determination from the order of processing.

4. Repeat Bidding Prohibition Determination Processing: #-checkWaitBid( ) Method.

In this processing, a prohibition range is set where the bidding cannot be performed for a certain time period after it is performed once. It is determined not to repeatedly make a bid. It is the processing for performing the natural bidding.

(1) TimerTask is run after the bidding is performed once, and the bidding is not performed until the timer expires.

(2) If it is determined that the bidding is possible, the subsequent right acquisition determination processing and character bidding determination processing are performed.

(3) The time of the timer is determined by the random number when the previous bidding is performed.

(4) When the auction enters the sell out state for the first time, it is determined that the bidding is possible regardless of the timer.

(5) Wait time is determined by the two parameters, "WAIT_WEIGHT_VARIABLE" and "WAIT_RONDOM_VARIABLE," which vary for every setting.

5. Right Acquisition Bidding Determination Processing: #checkDefaultBid( ) Method.

In this processing step, the processing is performed to acquire the right for winning a bid. The determinations (1) and (2) are performed for acquiring the right with the slow light holder or a sell out right holder being present. (1) The bidding is performed if the right holder is itself. (2) The bidding interval is linked to the repeat bidding prohibition determination processing. Here, the slow right holder refers to a person who makes a bid at the highest price when in a "slow state" where the auction price increases at a slower rate than usual, as described above. In addition, the sell out right holder refers to a person who makes a bid at the highest price when the price does not increase if any bidder is not present.

6. Character Bidding Determination Processing: #checkCharacterBid( ) Method.

As described above, this processing is performed to assign the character to the absentee agent and to give the variation by performing the bidding in accordance with the character. Giving the character is performed for the absentee agent and the bidding based on the character is performed. Specifically, the processing (1) to (5) is performed, as follows:

Although types of the characters are arbitrary, the following four types are contemplated, for example.

<AnyBidder> (Hereinbelow, Referred to as the Active Group)

The bidding is performed based on the probability regardless of the price. CHARACTER_ANY_BIDDER_WEIGHT is the base value of the random number for determining the probability that AnyBidder makes a bid, wherein the smaller it is, the higher the bidder probability is.

<FastPushBidder> (Hereinbelow, Referred to as the Fast Push Group)

The bidding is performed based on the probability regardless of the price at the bidding interval shorter than that of the other characters, CHARACTER_FAST_BIDDER_WEIGHT is the base value of the random number for determining the probability that FastPushBidder makes a bid, wherein the smaller it is, the higher the bidding probability is.

<CountBidder> (Hereinbelow, Referred to as the Passive Group)

The bidding is performed at the constant distribution interval. CHARACTER_COUNT_WEIGHT is a distribution interval at which CountBidder makes a bid, wherein the smaller that is, the larger the number of biddings is.

<RangeBidder> (Hereinbelow, Referred to as the Prudent Group)

The bidding is performed based on the difference between the current price and the price at the previous bidding. CHARACTER_RANGE_BIDDER_WEIGHT is the base value of the random number for determining the probability that RangeBidder makes a bid, wherein the smaller it is, the larger the number of biddings is.

(2) The characters are assigned starting from the absentee first place in the following order (the assignment is repeated from the beginning for the fifth place and later):

1) CountBidder
2) AnyBidder
3) FastPushBidder
4) RangeBidder (3) The bidding based on the characters is performed when there is no right holder.

(4) The bidding interval is linked to the repeat bidding prohibition determination processing.

(5) A new character can be created by inheriting a CharacterAbstract class.

Figure 8:
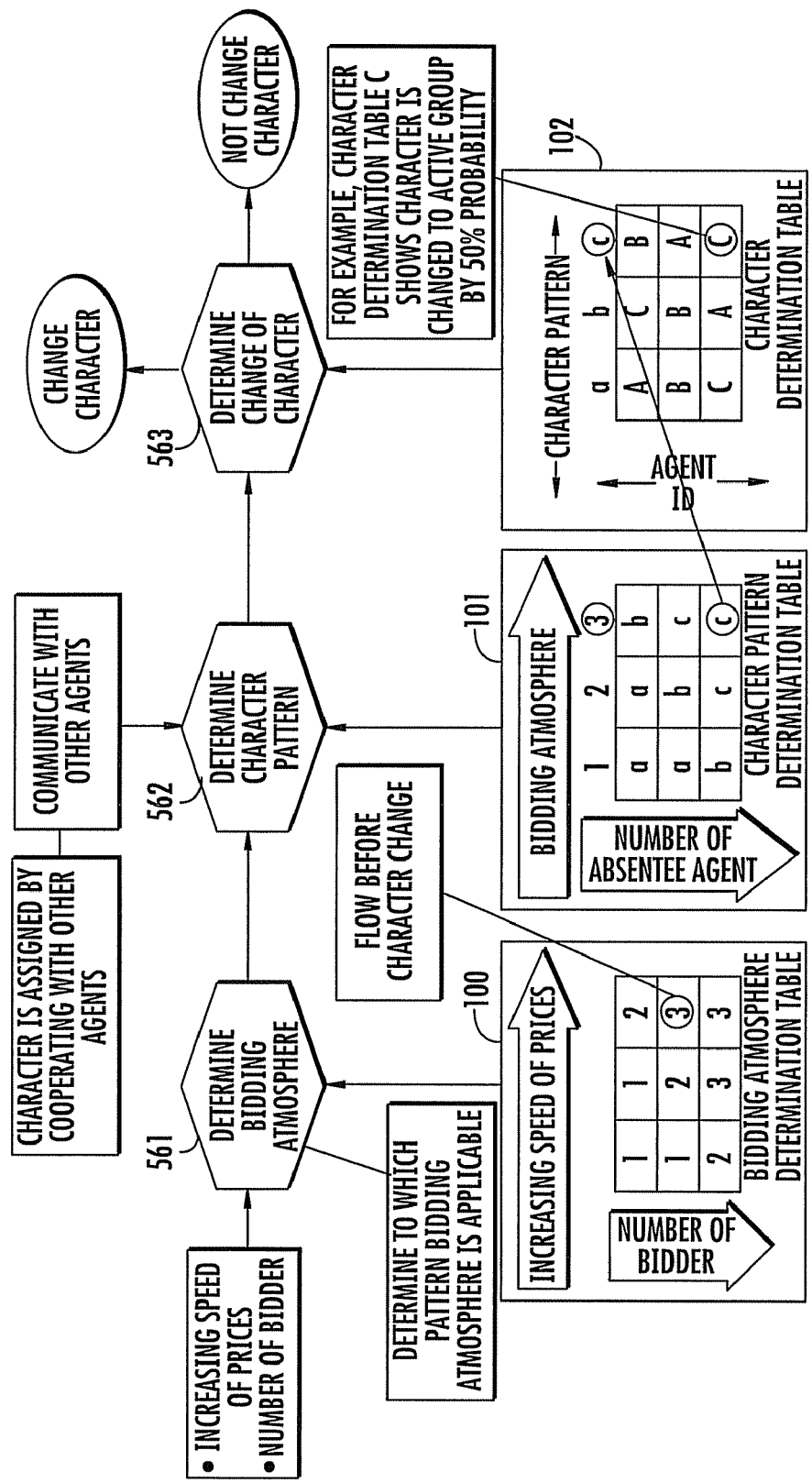
FIG. 8 is a schematic diagram illustrating a flow of the dynamic character change, according to an embodiment of the invention.

FIG. 8 is a diagram illustrating a flow of the dynamic character change. Here, there is described in more detail the character bidding determination processing (Step S6).

First, at Step S61, above, the bidding atmosphere is determined using the input of the increasing speed of the prices at the auction and the current number of bidders (the number of the on-site bidders). Namely, the bidding atmosphere (1, 2, or 3 in the drawing) is determined from the increasing speed of the prices and the number of bidders using a bidding atmosphere determination table 100. For example, the bidding atmosphere 1 represents a state where the auction is slow, the bidding atmosphere 2 represents a state where the auction is on average, and the bidding atmosphere 3 represents a status where the auction is hot. In this drawing, the bidding atmosphere 3 is selected.

Next, the character pattern is determined at Step S62. Namely, the "character pattern" is calculated from the bidding atmosphere calculated at Step S61 and the number of absentee agents which can currently make bids. Here, the "character pattern" represents the pattern in which it is determined that which character is assigned to each of the absentee agents. For example, a character pattern a defines that a character A (the active group) is assigned to the absentee agent 1, a character B (the passive group) is assigned to the absentee agent 2, and a character C (the prudent group) is assigned to the absentee agent 3. Similarly to the character pattern a, a character pattern b defines that the character C (the prudent group) is assigned to the absentee agent 1, the character B (the passive group) is assigned to the absentee agent 2, and the character A (the active group) is assigned to the absentee agent 3, while a character pattern c defines that the character B (the prudent group) is assigned to the absentee agent 1, the character A (the active group) is assigned to the absentee agent 2, and the character C (the prudent group) is assigned to the absentee agent 3. These character patterns are stored in the character pattern determination table 101, as illustrated. This drawing shows that character pattern c has been selected based on the bidding atmosphere 3 and the number of agents.

Next, at Step S63, the character is assigned for each agent ID using a character determination table 102, in accordance with the character pattern calculated at Step S62. In this example, the character B (the passive group) is assigned to the agent 1, the character A (the active group) is assigned to the agent 2, and the character C (the prudent group) is assigned to the agent 3. The assignment at this time is performed at a predetermined probability. For example, the probability that the character C (the prudent group) is assigned may be preliminarily defined as 50% in the character determination table, or it may be dynamically defined using the random number.

Figure 9:
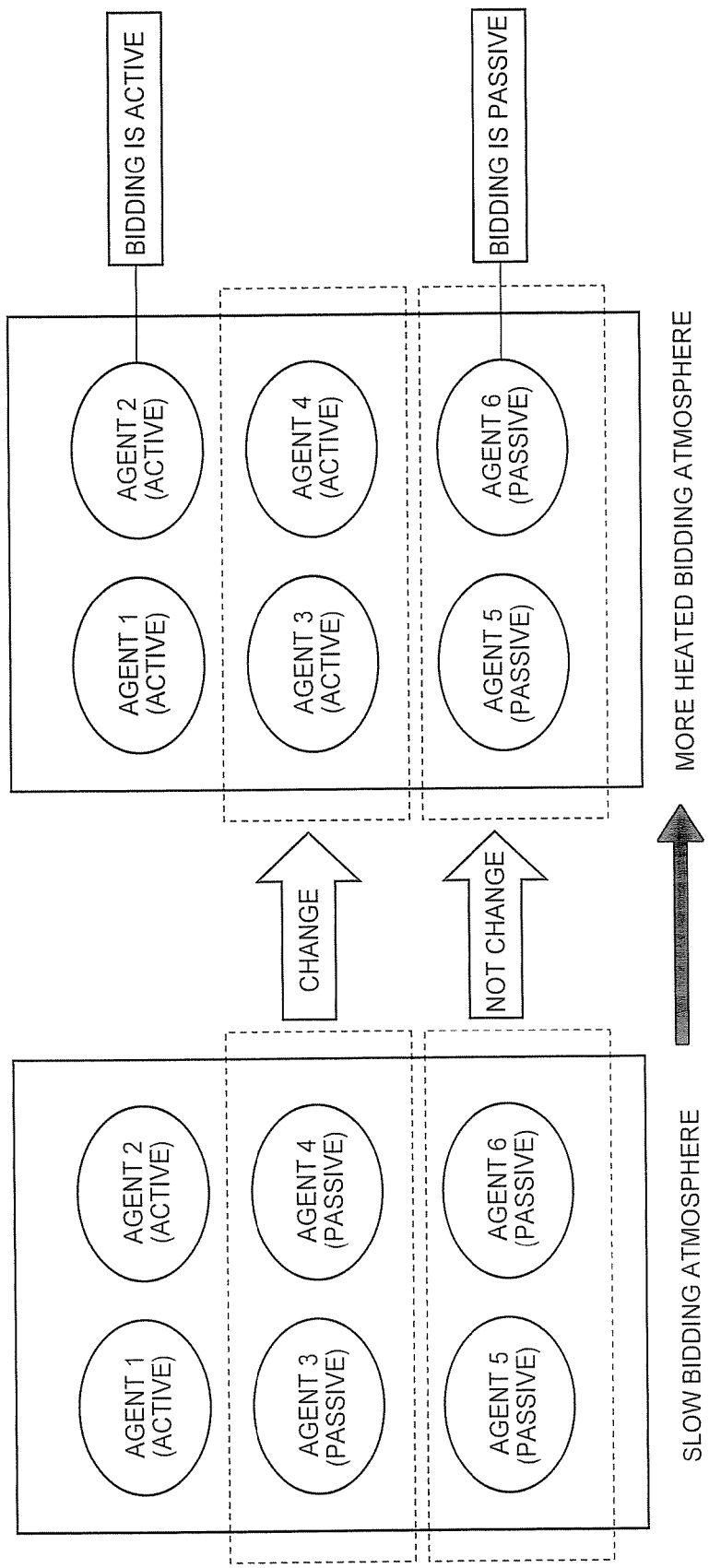
FIG. 9 is a schematic diagram illustrating an example of change in the whole bidding atmosphere by means of the dynamic character switching, according to an embodiment of the invention.

FIG. 9 is a diagram illustrating an example of change in the whole bidding atmosphere by means of the dynamic character change. For example, assume that the auction is in a slow atmosphere, while the current characters of the absentee agents are active for the agents 1 and 2, and passive for the absentee agents 3, 4, 5, and 6. At this time, if 50% of the passive agents are replaced to be active, the bidding atmosphere can be changed to be hot. In this manner, an auction status can also be controlled by assigning giving characters of the absentee agents.

EXAMPLES

Hereinafter, specific examples of an actual system implementation are described.

Switching in Rotation Per Auction.

In this specific example, the four types of characters are switched for the absentee agent in rotation. Thereby, the different characters appear in the consecutive auctions, creating a human-like bidding pattern, and the automatic bidding is difficult to be distinguished. It is also possible to randomly switch the characters.

Switching Character During Auction.

It is also contemplated to use an application in which the characters are dynamically changed during the auction depending on the auction status. It is possible to acquire auction information similar to that acquired by the on-site bidders to determine the auction status. Specifically, the number of bidders or the increasing speed of the prices can be understood as a numeric value, thereby the atmosphere of the auction can be speculated. For example, if the number of bidders is small and the increasing speed of the auction prices is low, it can be speculated that a final bidding price would be low or the auction would be less likely to be worked out when the auction is stagnating. When the absentee agent determines it, it is also possible to change the character to that which dynamically and actively makes a bid to warn up the auction. In addition, the atmosphere of the auction can be similarly changed. Since the absentee agents can also acquire the information which may be understood by other on-site bidders, it can actively affect the atmosphere of the auction by changing the characters in accordance with the auction status.

Cooperation with Other Agents.

The characters or states of other agents can be understood through the inter-agent communication. By using this, it is also possible to switch own character. Assume that each agent has selected the character A. In this case, since the bidding patterns of all the agents become similar to each other when seen by a person, it becomes easily recognized that the bidding is automatically performed. In this case, by some of the agents switching to other characters, the human-like bidding atmosphere can be created.

Cooperation Among Absentee Agents.

There are ten agents operating in this automatic bidding. Although these absentee agents operate similarly to the actual bidders, they cooperate with other absentee agents for part of functions. Requirements in the case where the absentee agents are bidding up against each other are as follows.

The absentee agent having the highest absentee price (the upper limit bidding price set by a client) wins the bid.

The agent having the highest absentee price (the absentee first place) wills the bid at the bidding price higher than that of the absentee agent having the next highest absentee price (the absentee second place).

Bidding priority may be taken by any absentee agent up to the prices of the absentee second place and lower.

When the bidding price reaches the absentee second place, the absentee agent in the absentee first place has the bidding priority (the absentee agent in the absentee second place makes a bid but does not have the priority).

Figure 10:
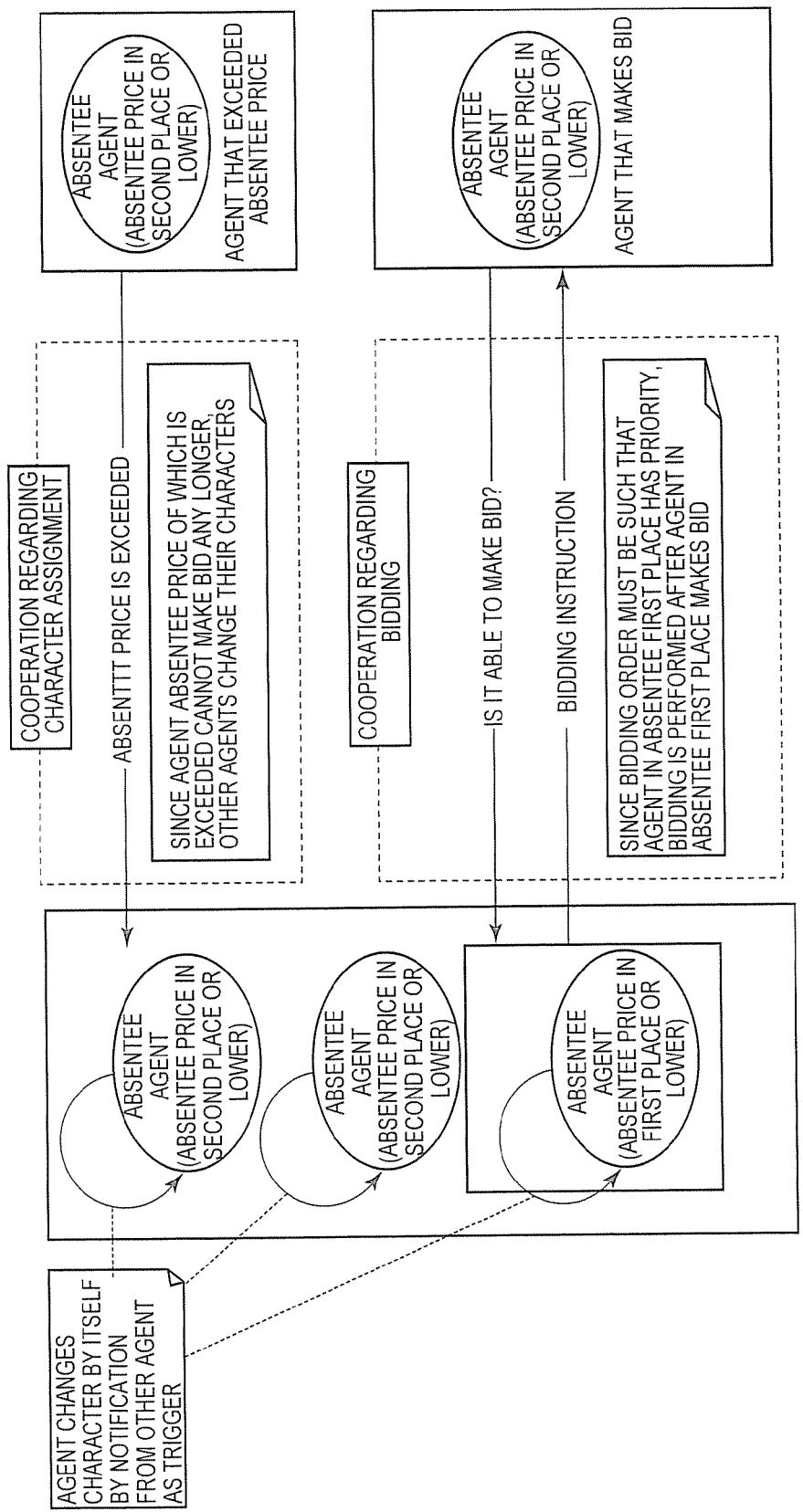
FIG. 10 is a schematic diagram illustrating the cooperation among the absentee agents, according to an embodiment of the invention.

FIG. 10 is a diagram illustrating such cooperation among the absentee agents.

Figure 11:
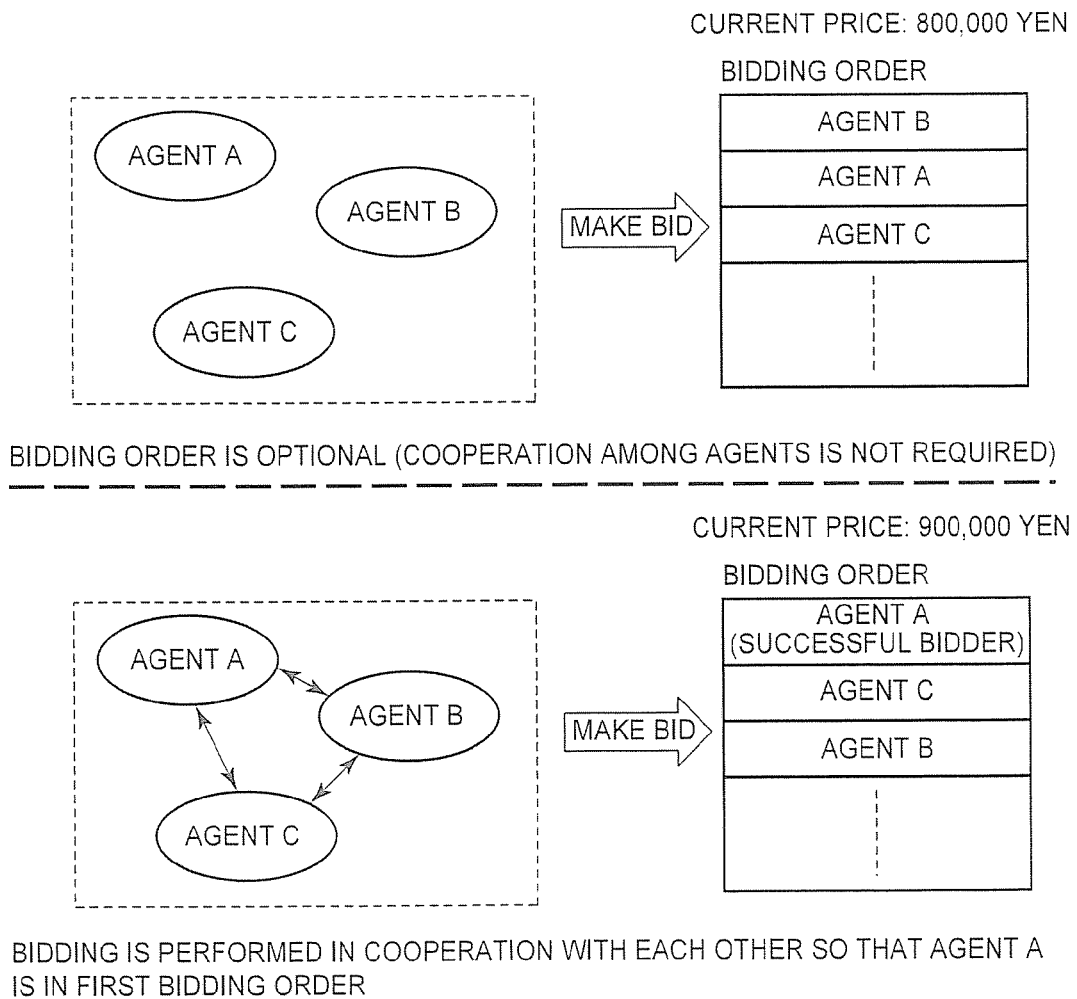
FIG. 11 is a schematic diagram illustrating a specific example of the cooperation among the absentee agents, according to an embodiment of the invention.

FIG. 11 is a diagram illustrating a specific example of cooperation among the absentee agents; assume that there are an absentee agent A making a bid at the absentee price of 1,000,000 yen, an absentee agent B making a bid at 900,000 yen, and an absentee agent C also making a bid at 900,000 yen. In this case, any absentee agent having the absentee price of less than 900,000 yen may freely make a bid without any problem. However, at the moment when the bidding price reaches 900,000 yen, the agent A must always have the priority. At this time, by the absentee agents A, B, and C cooperating with each other through the inter-agent communication, it becomes possible for the absentee agent A to always make a bid by priority.

Figure 12:
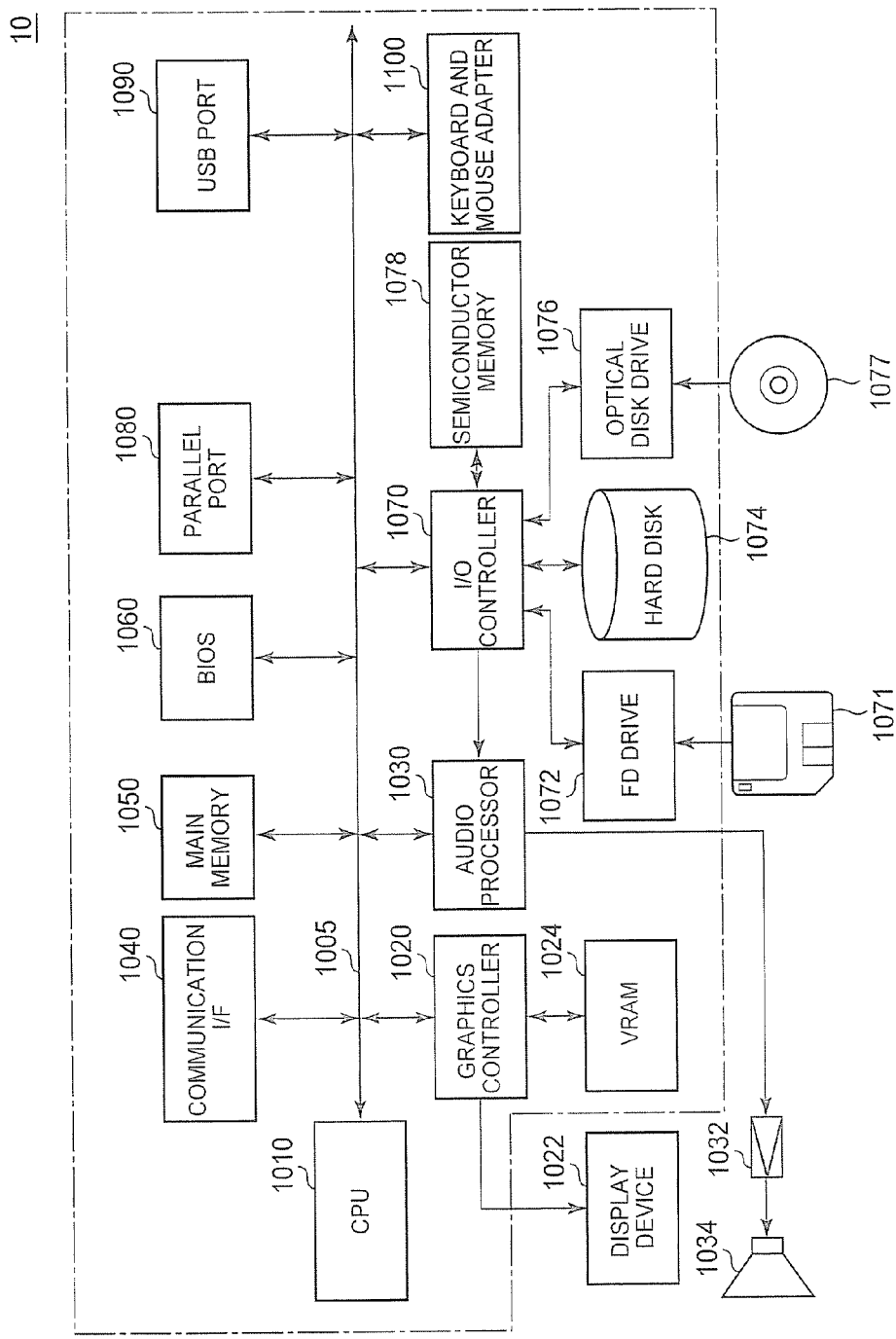
FIG. 12 is a schematic diagram illustrating a hardware configuration of an auction server, according to an embodiment of the invention.

FIG. 12 is a diagram illustrating the hardware configuration of the auction server 10 according to an embodiment of the present invention. Hereinafter, an overall configuration will be described as the information processing apparatus typically indicating a computer, but it is needless to say that a necessary minimum configuration can be selected for the dedicated device or an incorporated device according to the environment.

The auction server 10 is provided with a CPU (Central Processing Unit) 1010, a bus line 1005, a communication I/F 1040, a main memory 1050, a BIOS (Basic Input Output System) 1060, a parallel port 1080, an USB port 1090, a graphics controller 1020, a VRAM 1024, an voice processor 1030, an I/O controller 1070, and input means such as a keyboard and a mouse adapter 1100. Memory means, such as a flexible disk (FD) drive 1072, a hard disk 1074, an optical disk drive 1076, a semiconductor memory 1078, or the like can be connected to the I/O controller 1070.

An amplifier circuit 1032 and a loudspeaker 1034 are connected to the voice processor 1030. Additionally, a display unit 1022 is connected to the graphics controller 1020.

The BIOS 1060 stores a boot program that the CPU 1010 executes upon booting the auction server 10, a program depending on the hardware of the auction server 10, or the like. The FD (flexible disk) drive 1072 reads the program product or the data from a flexible disk 1071, and provides it for the main memory 1050 or the hard disk 1074 through the I/O controller 1070.

As the optical disk drive 1076, a DVD-ROM drive, a CD-ROM drive, a DVD-RAM drive, and a CD-RAM drive can be used, for example. In this case, it is necessary to use an optical disk 1077 corresponding to each drive. The optical disk drive 1076 can also read the program product or the data from the optical disk 1077, to provide it for the main memory 1050 or the hard disk 1074 through the I/O controller 1070.

The computer program product provided to the auction server 10 is stored in a record media, such as the flexible disk 1071, the optical disk 1077, or memory card, and is provided by the user. This computer program product is read from the recording medium through the I/O controller 1070, or is downloaded through the communication I/F 1040, thereby it is installed in auction server 10 to be executed. Since the operation that the computer program product causes the information processing apparatus to perform is the same as that in the apparatus which has already been described, the description thereof is omitted.

The above-mentioned computer program may be stored in an external storage medium. As the storage medium, an optical magnetic recording medium such as MD, and a tape medium other than the flexible disk 1071, the optical disk 1077, or the memory card can be used. Moreover, a storage unit, such as a hard disk or an optical disk library provided in a server system connected to a private telecommunication line or the Internet may be used as the recording medium to provide the computer program to the auction server 10 through a communication line.

Although the above example has mainly described regarding the auction server 10, the functions similar to those in the information processing apparatus described above can be realized by installing the program having the functions described regarding the information processing apparatus in the computer and operating the computer as the information processing apparatus. For that reason, the information processing apparatus described as one embodiment in the present invention can also be achieved by the method and the computer program thereof.

The apparatus of the present invention, as already noted can be achieved as hardware, software, or a combination of the hardware and the software. In an implementation by the combination of the hardware and the software, a typical example includes an implementation by the computer system having a predetermined program. This can be implemented with a computer-readable medium that stores computer-readable code, or a predetermined program. In this case, the predetermined program is loaded in and executed by the computer system, thereby the program causes the computer system to perform the processing according to the present invention. This program is constituted by a group of instructions which can be expressed by an arbitrary language, a code, or a notation. Such an instruction group enables the system to perform a specific function directly or after either or both of (1) conversion to another type of language, code, or notation, and (2) duplication to another medium are performed. Of course, the present invention encompasses not only such a program itself but also a program product including a medium with the program recorded thereon. The program for performing the function of the present invention can be stored in an arbitrary computer readable medium, such as a flexible disk, an MO, a CD-ROM, a DVD, a hard disk drive, a ROM, an MRAM, a RAM, or the like. In order to store in the computer readable medium, the program can be downloaded from a different computer system connected via a communication line or can be reproduced from another medium. The program can also be compressed or divided into plurality of pieces to be stored in a single recording medium or multiple recording media.

As mentioned above, although the present invention has been described based on the embodiments, the present invention is not limited to the embodiments described above. Furthermore, the advantages of the embodiments of the present invention are described only by way of citing the most suitable advantages derived from the present invention, and thus the advantages of the present invention are not limited to those described in the embodiments or the examples of the present invention.

The invention claimed is:

1. An auction system for enabling human-like automatic bidding by absentee agents for absent participants, comprising:
   a plurality of terminals; and
   an auction server connected to the terminals via a network and comprising a plurality of elements, each defining one of a plurality of absentee agents for making bids at an auction in response to absent participant requests that are conveyed from the network-connected terminals;
   wherein each absentee agent comprises:
      means for determining a bidding atmosphere of the auction based on a rate of bidding prices at the auction and number of on-site bidders that make bids at the auction;
      means for determining a character pattern for assigning a character to the absentee agent in accordance with the determined bidding atmosphere and a number of the absentee agents that can make bids at the auction; and
      means for changing the character of the absentee agent based on the determined character pattern and an ID of the absentee agent on the basis of a predetermined probability.

2. The system according to claim 1, wherein the character of the absentee agent includes at least one of a first character by which the absentee agent makes a bid based on a probability rather than a bidding price, a second character by which the absentee agent makes a bid based on a probability rather than a bidding price, but at a bidding interval that is shorter than a bidding interval of an agent assigned a different character, a third character by which the absentee agent makes a bid at a certain distribution interval, and a fourth character by which the absentee agent makes a bid when a difference between a current price and a price at a previous bidding is within a predetermined range.

3. The system according to claim 1, wherein the means for determining the character pattern further comprises means for determining the character pattern based on an agent communication between the absentee agent and at least one other absentee agent.

4. The system according to claim 3, wherein the absentee agent further comprises means for transmitting a message to another absentee agent having an absentee price in first place when the absentee agent has an absentee price not in first place, the absentee price of the absentee agent being a preset upper limit of a bidding price, and wherein the absentee agent further comprises means for determining whether or not to make a bid in response to an answer to the message.

5. The system according to claim 1, wherein the auction server has a first timer defining a maximum time period from a time when a highest price is bid in a case where the auction is in a "sell out state" to a time when a bidder having the highest price is determined to be a successful bidder if there is no next bidder; and wherein the absentee agent further comprises means for making a bid within the time period given by the first timer and after a time period defined by a second timer held by the absentee agent elapses.

6. In an auction system for enabling human-like automatic bidding by absentee agents for absent participants, an auction server connected to a plurality of terminals via a network, the auction server comprising:
   at least one memory; and
   at least one processor configured to:
      form a plurality of absentee agents in the auction server for making bids at an auction based on absent participant requests received from the terminals;
      determine a bidding atmosphere of the auction based on a rate of bidding prices at the auction and the number of on-site bidders;
      determine a character pattern for assigning a character for each of the absentee agents in accordance with the determined bidding atmosphere and the number of the absentee agents present in the auction system; and
      change the character of at least one of the absentee agents based on the determined character pattern and an ID of the at least one absentee agent on the basis of a predetermined probability.

7. The auction server according to claim 6, wherein the character of the absentee agents includes at least one of a first character by which an absentee agent makes a bid based on a probability rather than a bidding price, a second character by which the absentee agent makes a bid based on a probability rather than a bidding price, but at a bidding interval that is shorter than a bidding interval of an agent assigned a different character, a third character by which the absentee agent makes a bid at a certain distribution interval, and a fourth character by which the absentee agent makes a bid when a difference between a current price and a price at a previous bidding is within a predetermined range.

8. The auction server according to claim 6, wherein the means for determining the character pattern further comprises means for determining the character pattern based on an agent communication between an absentee agent and at least one other absentee agent.

9. The auction server according to claim 8, further comprising means for transmitting a message from an absentee agent to another absentee agent having an absentee price in first place when the absentee agent has an absentee price not in first place, the absentee price of the absentee agent being a preset upper limit of a bidding price, and wherein the absentee agent further comprises means for determining whether or not to make a bid in response to an answer to the message.

10. The auction server according to claim 6, wherein the auction server has a first timer defining a maximum time period from a time when a highest price is bid in a case where the auction is in a "sell out state" to a time when a bidder having the highest price is determined to be a successful bidder if there is no next bidder; and further comprises means for making a bid within the time period given by the first timer and after a time period defined by a second timer held by the absentee agent elapses.

11. A method for enabling human-like automatic bidding by absentee agents for absent participants of an auction system comprising the steps of:
   providing an auction system including an auction server and a plurality of terminals connected to the auction server via a network;

forming a plurality of absentee agents in the auction server for making bids at an auction, in place of absent participants that cannot attend the auction;

determining a bidding atmosphere of the auction based on a rate of bidding prices at the auction and a number of on-site bidders, determining a character pattern for assigning a character for each of the absentee agents in accordance with the determined bidding atmosphere and a number of the absentee agents present in the auction system; and changing the character assigned to at least one absentee agent based on the determined character patterns and an ID of the absentee agent on the basis of a predetermined probability.

12. The method according to claim 11 wherein the character of the absentee agents includes at least one of a first character by which an absentee agent makes a bid based on a probability rather than a bidding price, a second character by which the absentee agent makes a bid based on a probability rather than a bidding price, but at a bidding interval that is shorter than a bidding interval of an agent assigned a different character, a third character by which the absentee agent makes a bid at a certain distribution interval, and a fourth character by which the absentee agent makes a bid when a difference between a current price and a price at a previous bidding is within a predetermined range.

13. The method according to claim 11, wherein determining the character pattern comprises determining the character pattern based on an agent communication between an absentee agent and at least one other absentee agent.

14. The method according to claim 13, further comprising transmitting a message from an absentee agent to another absentee agent having an absentee price in first place when the absentee agent has an absentee price not in first place, the absentee price of the absentee agent being a preset upper limit of a bidding price, and determining whether or not to make a bid in response to an answer to the message.

15. The method according to claim 11, further comprising providing a first timer defining a maximum time period from a time when a highest price is bid in a case where the auction is in a "sell out state" to a time when a bidder having the highest price is determined to be a successful bidder if there is no next bidder; and making a bid within the time period given by the first timer and after a time period defined by a second timer held by the absentee agent elapses.

16. A non-transitory computer-readable medium comprising computer-readable code that, when loaded to an auction server which is part of an auction system and which is connected to a plurality of terminals via a network, causes the auction server to perform a method for enabling human-like automatic bidding by absentee agents for absent participants of the auction system comprising the steps of:

forming a plurality of absentee agents in the auction server for making bids at an auction, in place of absent participants that cannot attend the auction;

determining a bidding atmosphere of the auction based on a rate of bidding prices at the auction and a number of on-site bidders;

determining a character pattern for assigning a character for each of the absentee agents in accordance with the determined bidding atmosphere and a number of the absentee agents present in the auction system; and changing the character assigned to at least one absentee agent based on the determined character patterns and an ID of the absentee agent on the basis of a predetermined probability.

17. The computer-readable medium according to claim 16, wherein the character of the absentee agents includes at least one of a first character by which an absentee agent makes a bid based on a probability rather than a bidding price, a second character by which the absentee agent makes a bid based on a probability rather than a bidding price, but at a bidding interval that is shorter than a bidding interval of an agent assigned a different character, a third character by which the absentee agent makes a bid at a certain distribution interval, and a fourth character by which the absentee agent makes a bid when a difference between a current price and a price at a previous bidding is within a predetermined range.

18. The computer-readable medium according to claim 16, wherein determining the character pattern further comprises determining the character pattern based on an agent communication between an absentee agent and at least one other absentee agent.

19. The computer-readable medium according to claim 18, further comprising causing the auction server to transmit a message from an absentee agent to another absentee agent having an absentee price in first place when the absentee agent has an absentee price not in first place, the absentee price of the absentee agent being a preset upper limit of a bidding price, and determining whether or not to make a bid in response to an answer to the message.

20. The computer-readable medium according to claim 16, further comprising causing the auction server to set a first timer defining a maximum time period from a time when a highest price is bid in a case where the auction is in a "sell out state" to a time when a bidder having the highest price is determined to be a successful bidder if there is no next bidder; and making a bid within the time period given by the first timer and after a time period defined by a second timer held by the absentee agent elapses.

* * * * *